United States Patent [19]
Theijsmeijer

[11] 3,861,517
[45] Jan. 21, 1975

[54] ROLLER ADJUSTMENT ADAPTOR FOR SCREW ADJUSTMENT OF BELT DRIVEN LIVE ROLLER CONVEYOR ROLLS

[75] Inventor: Frederik Theijsmeijer, Ellwood City, Pa.

[73] Assignee: Rexnord Inc., Milwaukee, Wis.

[22] Filed: Mar. 22, 1974

[21] Appl. No.: 454,034

[52] U.S. Cl............... 198/127 R, 248/274, 267/137
[51] Int. Cl............................................ B65g 13/07
[58] Field of Search................. 198/127 R; 267/137; 248/274

[56] References Cited
UNITED STATES PATENTS

| | | | |
|---|---|---|---|
| 2,493,479 | 1/1950 | Eggleston | 198/127 R |
| 3,420,356 | 1/1969 | DeGood | 198/127 R |
| 3,563,365 | 2/1971 | Loberg | 198/127 R |
| 3,720,302 | 3/1973 | Kegler | 198/127 R |

Primary Examiner—Evon C. Blunk
Assistant Examiner—Richard K. Thomson
Attorney, Agent, or Firm—Sughrue, Rothwell, Mion, Zinn & Macpeak

[57] ABSTRACT

Belt driven, live roller conveyors of the type having a series of upper rollers driven by a belt between the upper rollers and snubbing rollers includes unique means for adjusting the snubbing rollers from an L-shaped clip attached to the roller supporting frame. This means is a one-piece molded plastic adaptor having a blind hole for the axle of the snubbing roller, a hole for an adjusting screw from the L-shaped clip and an integral cylindrical shaped neck which is collapsible but resilient to allow the screw to adjust the level of the roller relative to the clip. The adaptor also is shaped to bear against the frame to prevent end-wise shifting of the axle of the snubbing roller.

8 Claims, 4 Drawing Figures

PATENTED JAN 21 1975 3,861,517
FIG.1
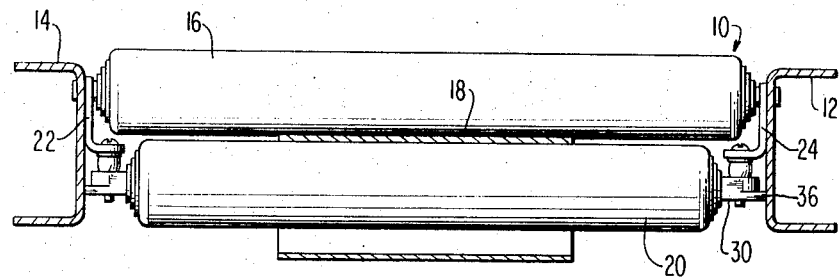
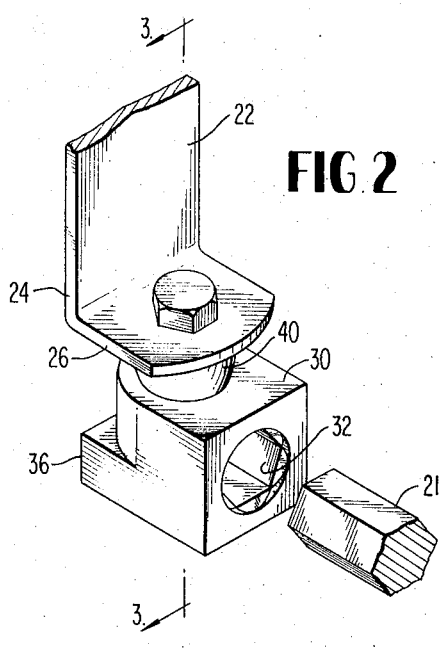
FIG.2
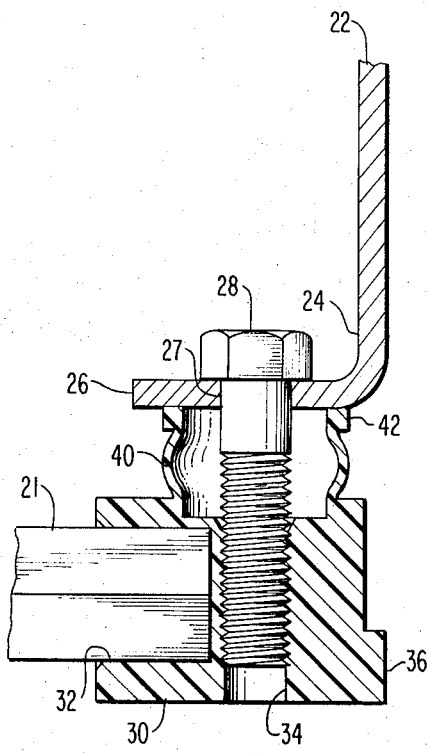
FIG.3
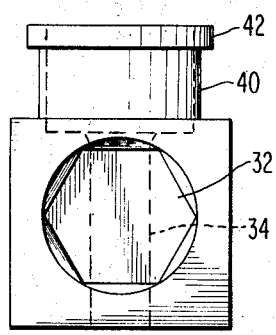
FIG.4

ROLLER ADJUSTMENT ADAPTOR FOR SCREW ADJUSTMENT OF BELT DRIVEN LIVE ROLLER CONVEYOR ROLLS

BACKGROUND OF THE INVENTION

1. Field of the Invention

This invention relates to an adaptor for use in the screw adjustment of conveyor rollers and particularly for snubbing rollers of belt driven, live roller conveyors.

2. Description of the Prior Art

Belt driven, live roller conveyors are a standard, well-known type of conveyor in the prior art. Typical conveyors of this type include an upper set of driven rollers, a lower set of snubbing rollers and a belt between the two sets of rollers for driving the upper rollers under pressure applied by the snubbing or pressure rollers. The two series of rollers are mounted between frames and the lower pressure or snubbing rollers are generally mounted from clips attached to the frames. In the past, it has been known to adjust the clip by a screw and slot arrangement between the clip and the frame for the purpose of adjustment of the snubbing rollers to move them closer or farther away from the driven rollers. A typical arrangement is shown in the catalog of the assignee of this application, Rexnord Inc., catalog HB/70, page 5C-4.

Another type of live roller conveyor having pressure or snubbing rollers which are desirably adjustable is an accumulating conveyor of the type, for example, shown in the Forsyth et al U.S. Pat. No. 3,266,617, assigned to the assignee of this application. In the commercial embodiment of such conveyors, the snubbing rollers have been adjustable by means of a screw carried by an L-shaped clip, the screw extending into a tapped hole in the stationary axle of the roller. This construction requires drilling and tapping each end of the axle, and, especially when the axles are relatively small in diameter, this has created problems, and is also quite expensive. Nevertheless, some means for screw adjustment of the snubbing rollers in accumulating conveyors is highly desirable.

SUMMARY OF THE INVENTION

This invention provides a unique one-piece molded plastic adaptor for attaching to the prior art L-shaped clip suspended from the frames of a roller conveyor for the purpose of adjusting the roll from a screw carried by the clip. The plastic adaptor has a blind hole for holding the axle of the conveyor roller, a hole at right angles thereto for accommodating the screw, a collapsible integral neck with an outer flange for abutting aginst the clip, and a back portion which bears against the frame for steadying the axle. This adaptor allows for the needed screw adjustment of the rollers in the various known types of conveyors discussed above, while eliminating the drilling and tapping of the axle.

BRIEF DESCRIPTION OF THE DRAWING

FIG. 1 is a transverse sectional elevation view of a conveyor roller assembly with the adaptor of this invention applied thereto;

FIG. 2 is a perspective view of the adaptor of this invention;

FIG. 3 is a sectional elevation view of the adaptor with the adjustment screw and supporting clip; and FIG. 4 is an end elevation view of the adaptor.

DETAILED DESCRIPTION OF THE PREFERRED EMBODIMENT

A conveyor 10 of the driven live roller type has a pair of frames 12 and 14 between which are mounted driven rollers 16. These rollers are driven by a belt 18 and pressure is applied to the belt by pressure or snubbing rollers 20.

The snubbing rollers 20 are journalled on bearings on stationary axles 21, and are suspended from the frames via L-shaped clips 22. These L-shaped clips have a portion 24 flat with the frame and a portion 26 at right angles to the surface of the frame. The portion 26 has a hole 27 to accommodate an adjustment screw 28.

The adjustment screw is threaded into an adaptor 30 which is the unique feature of this invention. Adaptor 30 is shown in FIGS. 2, 3 and 4, and is molded in one piece of a suitable plastic material which is collapsible, but has some elastic memory and preferably is low cost. One suitable material is low density polyethylene. The adaptor 30 is injection molded and has a blind hole 32 of hexagonal shape corresponding with the axle 21 of the snubbing roller 20. It also has a hole 34 for receiving the adjustment screw. This hole is not threaded and the screw itself forms the threads as it is inserted. Opposite the blind hole 32 is a flat surface portion 36 which abuts up against the frame to steady the stationary snubbing axle between the two frames. Concentric with the screw hole and on top of the adaptor is an integral cylindrical neck 40 having a top cylindrical flange 42.

In use, the adaptors 30 are on each end of the stationary axle 21 and are secured to the clips 22 by the adjustment screw 28 which is tightened at the factory until the clip portion 26 contacts the rim or flange 42. Any adjustment necessary in the field may take place by a predetermined number of turns on the adjustment screws of all rollers. The portions 36 abutting against the frames provide positive support to prevent end-wise movement of the hexagonal axle 21. The reinforcing ring 42 is utilized so that neck 40 will not split when the screw is tightened. By turning the screw clockwise, the thin cylindrical neck 40 will collapse, thus raising the snubbing roller closer to the tread rollers, increasing the amount of engagement between the belt. There is enough elasticity in the neck 40 so that the roller can be lowered a small amount in case it has been overtightened, and this elasticity also applies continuous pressure to prevent loosening of the adjustment screw.

In one commercial embodiment, but non-limiting example, the adaptor 30 is provided with neck 40 of about ½ inch internal diameter, 0.032 inch wall thickness, and 0.312 inch height from the body of the adaptor to the top of the rim 42. The rim 42 is about 0.080 inch deep. The screw hole is about .215 inch in diameter. The adjustment screw is a machine screw with a hex and slotted head. The adaptor has provided the needed screw adjustment in accumulating conveyors over a period of months, has operated very satisfactorily by providing superior performance as well as economic advantages over the prior means of adjustment of such conveyors.

I claim:

1. In combination with a belt driven, live roller conveyor assembly of the type including a series of driven rollers journalled between a pair of side frames, a series of snubbing rollers journalled on axles between the frames at a level below the driven rollers, a drive belt between the driven and snubbing rollers, and means for vertically adjustably mounting the snubbing rollers from the frame including a clip attached to each frame above the axis of each snubbing roller, and an adjustment screw for attaching the clip to the snubbing roller axle, the improvements comprising: a one-piece molded plastic adaptor having a hole for holding the axle of the snubbing roller and having another hole for receiving the adjustment screw, an integral cylindrical shaped neck extending upwardly toward the clip, the neck being collapsible but resilient upon adjustment of the screw.

2. A belt driven, live roller conveyor assembly as defined in claim 1, wherein the top of the neck includes a thickened flange for contacting the clip.

3. A belt driven, live roller conveyor assembly as defined in claim 2, wherein the adaptor is molded in one piece of a resilient material.

4. A belt driven, live roller conveyor assembly as defined in claim 2, wherein the adaptor body includes a flat portion on a side opposite the blind axle hole for abutting against the frame to steady the axle.

5. A belt driven, live roller conveyor assembly as defined in claim 4, wherein the adjustment screw hole is not threaded and the adjustment screw forms threads therein as it is assembled so as to be self locking.

6. A belt driven, live roller conveyor assembly as defined in claim 4, wherein the cylindrical neck is concentric with and surrounds the adjustment screw hole and the blind axle hole is at right angles to the common axis of the neck and screw hole.

7. A belt driven, live roller conveyor assembly as defined in claim 2, wherein the hole for receiving the snubbing roller axle is non-circular to prevent the axle from rotating.

8. A belt driven, live roller conveyor assembly as defined in claim 3, wherein the resilient material is low density polyethylene.

* * * * *